US005467865A

United States Patent [19]

Irwin

[11] Patent Number: 5,467,865
[45] Date of Patent: Nov. 21, 1995

[54] CONVEYOR BELT WITH TEXTURED EDGE

[76] Inventor: Guy L. Irwin, 512 Oreland Mill Rd., Oreland, Pa. 19075

[21] Appl. No.: 927,923

[22] Filed: Aug. 6, 1992

Related U.S. Application Data

[63] Continuation of Ser. No. 748,440, Aug. 22, 1991, Pat. No. 5,137,141, which is a continuation of Ser. No. 410,348, Sep. 21, 1989, abandoned.

[51] Int. Cl.⁶ .................................................... B65G 21/18
[52] U.S. Cl. ............................................................ 198/778
[58] Field of Search ............................................... 198/778

[56] References Cited

U.S. PATENT DOCUMENTS

| 3,348,659 | 10/1967 | Roinestad | 198/778 |
| 4,023,381 | 5/1977 | Onodera | 198/778 X |
| 4,394,901 | 7/1983 | Roinestad | 198/850 |
| 4,448,301 | 5/1984 | Alger | 198/778 |
| 4,450,953 | 5/1984 | Le Cann et al. | 198/778 |
| 4,679,687 | 7/1987 | Rehm | 198/778 |
| 4,742,907 | 5/1988 | Palmaer | 198/831 |
| 4,852,720 | 8/1989 | Roinestad | 198/778 |
| 4,901,844 | 2/1990 | Palmaer et al. | 198/778 |
| 4,924,998 | 5/1990 | Fuller, Jr. | 198/778 |
| 4,941,566 | 7/1990 | Irwin | 198/778 |

OTHER PUBLICATIONS

Ashworth Brochure, "Omniflex & Omni-Grid", Bulletin No. 071.
KVP Brochure, "All-In-One Plastic Belt", Apr. 1982.

Primary Examiner—James R. Bidwell
Attorney, Agent, or Firm—George J. Brandt, Jr.; Thomas R. Morrison; Morrison Law Firm

[57] ABSTRACT

A conveyor belt has a textured edge for use in a spiral conveyor which includes a plurality of protrusions on the edge of the belt engaging the capstan, providing enhanced friction between the belt and the capstan. The protrusions may be placed on end links or reenforcement links, and may be a part of rods connecting links of the belt. In one of the embodiments, the capstan is textured as well to provide an additional friction. As the result, the driving force is transmitted to the belt much more efficiently, and the practical use of the plastic conveyor belt in the spiral conveyor systems is possible. In one of the embodiments, the conveyor belt is made predominantly of plastic.

1 Claim, 6 Drawing Sheets

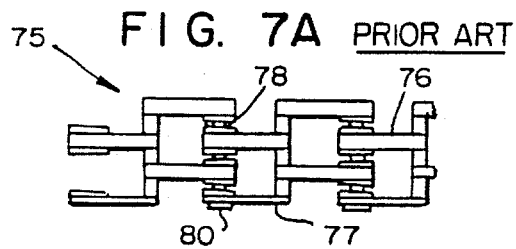
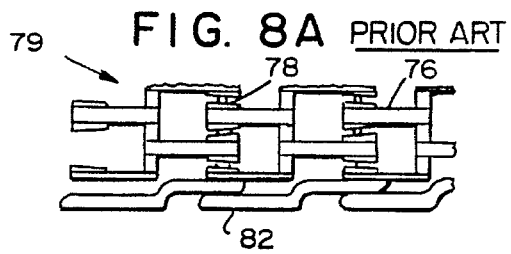
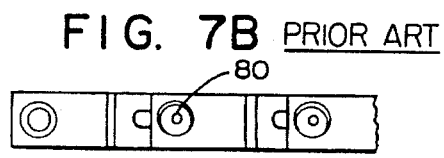
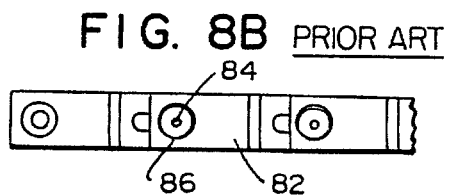
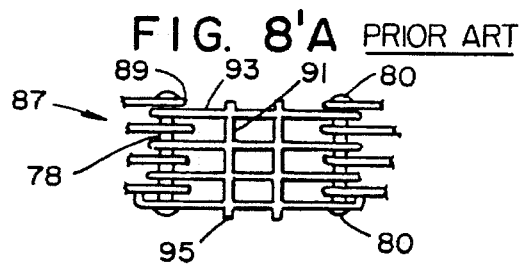
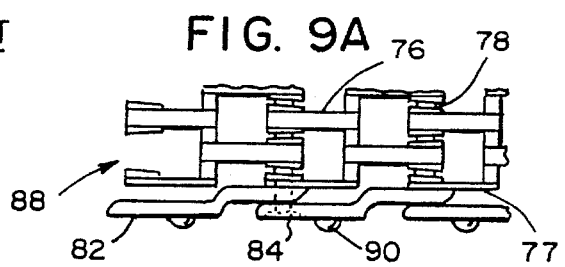
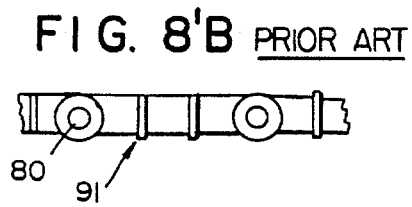
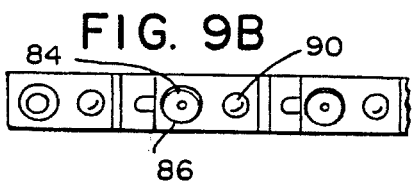
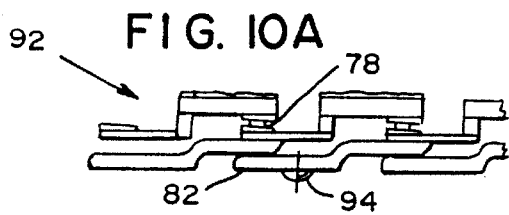
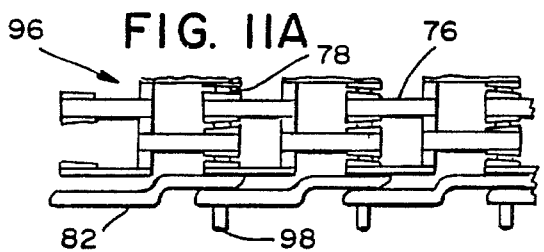
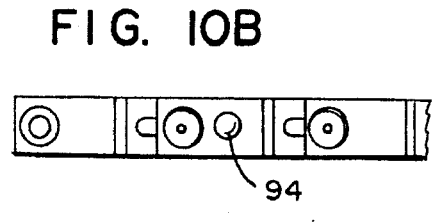
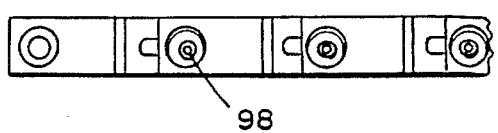

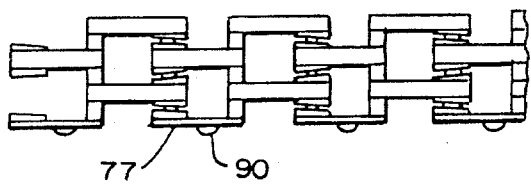
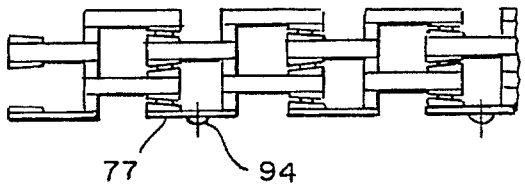
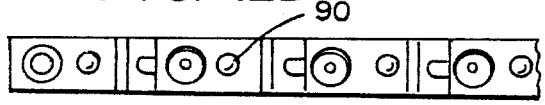
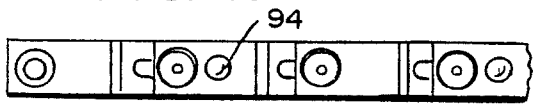
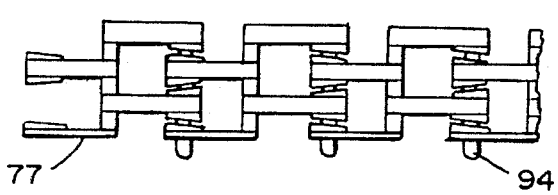
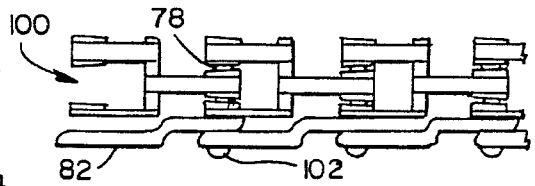
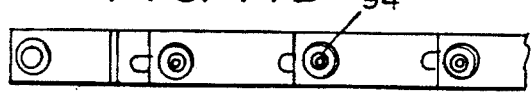
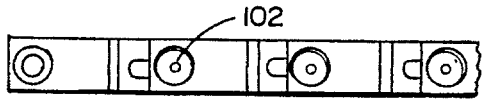
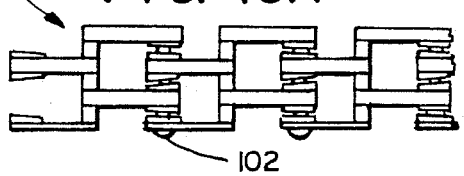
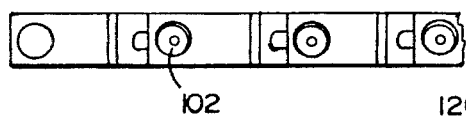
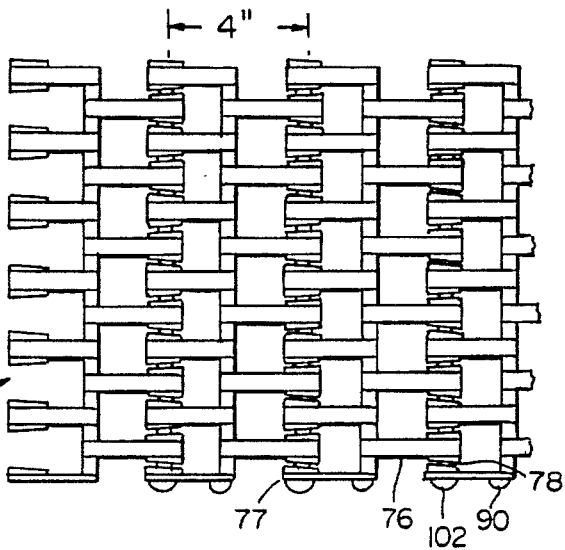
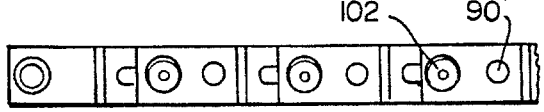

CONVEYOR BELT WITH TEXTURED EDGE

This is a continuation of application Ser. No. 07/748,440 filed on Aug. 22, 1991, now U.S. Pat. No. 5,137,141, which in turn was a continuation of application Ser. No. 07/410,348, filed Sep. 21, 1989, now abandoned.

BACKGROUND OF THE INVENTION

The present invention relates to material handling equipment and, more particularly, to a conveyor system having a spiral portion.

One type of conveyor is known having a conveyor belt in which a portion of the conveyor belt is formed into an ascending or descending spiral. The ends of the spiral are connected together through an out-run, a return-run and an in-run. The conveyor is at least partly driven by a capstan rotating within the spiral portion and contacting the inner edge of the conveyor belt as it traverses the spiral. Frictional forces are controlled by a sprocket drive on the out-run which controls longitudinal tension in the conveyor belt. In effect, the amount of drive is controlled by the amount of longitudinal tension applied to the out-run. This is similar to a nautical winch in which a plurality of turns in the bight of a rope are wound on a rotating reel. If the rope exiting the reel is left slack, the reel turns with insufficient friction with the rope to pull the incoming rope. If a moderate tension is applied to the exiting rope, a substantial force is applied to the incoming rope.

Spiral conveyors are disclosed in U.S. Pat. No. 3,348,659 (now expired) and 4,078,655.

Spiral conveyors of the type described above, and disclosed in the referenced patents, are frequently used in food-preparation establishments to hold freshly baked goods in a cooling environment for a substantial time prior to a succeeding operation such as, for example, packaging. The food-preparation industry shares with other industries the desire for improved productivity. One approach to improved productivity includes increasing the throughput of spiral conveyors. Throughput is achieved by increasing the linear speed of the conveyor belt.

As the linear speed of the conveyor belt increases, it becomes increasingly difficult to couple enough torque through the frictional contact between the outer surface of the capstan and the inner edge of the belt without applying destructive tension in the conveyor belt. The lack of friction between the belt and the capstan is especially acute if the belt is made of plastic. Such low friction becomes even lower if there under wet and/or icy conditions, which occur very frequently in the food industry.

Making belts from plastics has some distinct advantages, however. Some of these advantages are: the price of a plastic belt is usually lower than that of a metal belt; the weight of the plastic belt is significantly lower than the weight of the metal belt; it is substantially easier to maintain the plastic belt clean due to the lower adhesion of production debris and dirt to plastic. Plastic belts driven by sprocket wheels are described, for instance, in the U.S. Pat. No. 4742907. Plastic belts are also described in the U.S. Pat. No. 4,394,901. However, plastics have lower load bearing capacity than metals, and their use in spiral systems is restricted.

Therefore, one of the problems with conveyor belts for spiral systems is difficulty of the transmittal of a driving force from the capstan to the belt. The difficulty is especially severe in the case of plastic belts.

OBJECTS AND SUMMARY OF THE INVENTION

It is an object of the invention to provide a spiral conveyor which overcomes the drawbacks of the prior art.

It is a further object of the invention to provide an interface between a capstan of a spiral conveyor and an inner surface of a conveyor belt which increases the drive force applied to the conveyor belt.

It is a still further object of the invention to provide a conveyor belt with an improved friction properties.

It is a still further object of the invention to provide a predominantly plastic belt which is able to provide increased friction between the belt and a capstan of a spiral conveyor system.

It is a still another object of the invention to provide a conveyor belt able to transmit driving force more efficiently.

It is a still further object of the invention to provide a conveyor belt which has a textured edge, for use in a spiral conveyor.

It is a still further object of the invention to provide a predominantly plastic belt with a textured edge.

It is a still further object of the invention to provide a spiral conveyor having a predominantly plastic belt with a textured edge co-acting with a textured capstan.

It is a still further object of the invention to provide a capstan-conveyor belt interacting system with higher friction between the capstan and the belt.

It is still an another object of the present invention to provide a textured belt for use in spiral conveyors which consists of links or independent connected units, having textured end links or units, textured reinforcement links or units, or protruding heads of rods connecting the links or units. It is still an another object of the present invention to provide the plastic belt of the above type.

Briefly stated, the present invention provides a conveyor belt with a textured edge for use in a spiral conveyor which includes a plurality of protrusions on the belt edge engaging the capstan, providing an additional friction between the belt and the capstan. The protrusions may be placed on end links or reenforcement links which form the engaging edge of the belt, may be a part of rods connecting links of the belt, or they may be placed on the engaging edge in any other way.

In one of the embodiments, the capstan is textured as well to provide additional friction. As the result, the driving force is transmitted to the belt much more efficiently, and the practical use of a plastic conveyor belt in a spiral conveyor system is enabled. In one of the embodiments, the conveyor belt is made predominantly of plastic.

Briefly stated, the present invention provides a conveyor belt having a textured edge for use in a spiral conveyor which includes a plurality of protrusions on the edge of the belt engaging the capstan, providing enhanced friction between the belt and the capstan. The protrusions may be placed on end links or reenforcement links, and may be a part of rods connecting links of the belt. In one of the embodiments, the capstan is textured as well to provide an additional friction. As the result, the driving force is transmitted to the belt much more efficiently, and the practical use of a plastic conveyor belt in the spiral conveyor systems is possible. In one of the embodiments, the conveyor belt is made predominantly of plastic. The protrusions also make possible the use of belts with longitudinal pitches higher than one and two inches.

According to an embodiment of the invention, there is provided a spiral conveyor, comprising: a predominantly plastic conveyor belt, the conveyor belt being of a type that is capable of telescoping at one edge to conform to a spiral shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including a plurality of protrusions, and the plurality of protrusions being disposed and shaped to increase a friction with the peripheral surface.

According to a feature of the invention, the above belt has a longitudinal pitch greater than two inches.

According to a feature of the invention, there is provided a conveyor belt for use in spiral conveyors, the capstan having a driven capstan with a generally cylindrical peripheral surface, the belt being of a type that is capable of telescoping at one edge to conform in a spiral shape to the peripheral surface, comprising: a body consisting of interconnected links, the body having an inner edge for contacting the peripheral surface, the inner edge having a plurality of reenforcement links, at least some of the links have protrusions which contact the peripheral surface, thereby providing an improved frictional contact with the surface of the capstan.

According to a further feature of the invention, there is provided a conveyor belt for use in spiral conveyors, the belt being of a type that is capable of telescoping at one edge to conform to a spiral shape, comprising: a body consisting of interconnected links wherein means for interconnecting includes connecting rods, the body having an inner edge for contacting a capstan of the spiral conveyor, the inner edge having reenforcement links, at least some of the rods extend past the reenforcement links forming extending ends, and the extending ends interacting with a surface of the capstan thereby providing an improved frictional contact with the surface of the capstan. The reenforcement links may also have additional protrusions. In one of the embodiments, a longitudinal pitch of the belt is greater than two inches for a plastic belt, and greater than one inch for a metal belt.

According to still further feature of the invention, there is provided a conveyor belt for use in spiral conveyors, the belt being of a type that is capable of telescoping at one edge to conform to a spiral shape, comprising: a body, the body including interconnected links, the body having an inner edge for contacting a capstan of the spiral conveyor, the inner edge having end units, and at least some of the end units have protrusions which interact with a surface of the capstan providing an improved frictional contact with the surface of the capstan. In the embodiments of the above belt, its longitudinal pitch may be greater than two inches for a plastic belt and greater than one inch for a metal belt.

According to a still further feature of the invention, there is provided a spiral conveyor, comprising: a conveyor belt, the conveyor belt being of a type that is capable of telescoping at one edge to conform to a cylindrical shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including reenforcement links on its extremity contacting the peripheral surface, wherein the reenforcement links have a plurality of protrusions able to interact with the peripheral surface, a plurality of grooves in the peripheral surface, and the plurality of grooves being shaped and disposed to interact with the plurality of protrusions to modify a transmittal of a driving force from the capstan to the conveyor belt. In other embodiments of the above conveyor, a longitudinal pitch for the belt is greater than two inches for a predominantly plastic belt, and greater than one inch for a predominantly metal belt.

According to another feature of the invention, there is provided a spiral conveyor, comprising: a predominantly plastic conveyor belt having a body comprising links interconnected by interconnecting rods, the conveyor belt being of a type that is capable of telescoping at one edge to conform to a spiral shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including reenforcement links on its extremity contacting the peripheral surface, at least some of the connecting rods extend past the reenforcement links forming extending ends, the extending ends interacting with the peripheral surface, a plurality of grooves in the peripheral surface, and the plurality of grooves being shaped and disposed to interact with the extending ends to modify a transmittal of a driving force from the capstan to the conveyor belt.

According to yet another feature of the invention, there is provided a spiral conveyor, comprising: a predominantly plastic conveyor belt having a body comprising links interconnected with interconnecting rods, the conveyor belt being of a type that is capable of telescoping at one edge to conform to a spiral shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including end links on its extremity contacting the peripheral surface, wherein at least some of the connecting rods extend past the end links forming extending ends, wherein the extending ends are able to interact with peripheral surface of the capstan, a plurality of grooves in the peripheral surface, and the plurality of grooves being shaped and disposed to interact with the extending ends to modify a transmittal of a driving force from the capstan to the conveyor belt.

In a further feature of the invention, there is provided a spiral conveyor, comprising: a conveyor belt, the conveyor belt being of a type that is capable of telescoping at one edge to conform to a spiral shape, a capstan, the capstan being generally cylindrical with a vertical central axis, means for rotating the capstan about the vertical central axis, a peripheral surface on the capstan, at least a portion of the conveyor belt being conformed in the spiral shape with an inner edge thereof contacting the peripheral surface, means for applying a longitudinal tension to the conveyor belt at least in a vicinity of a departure of the conveyor belt from the spiral shape, the inner edge including end units on its extremity contacting the peripheral surface wherein the end units have a plurality of protrusions able to interact with the peripheral surface of the capstan, a plurality of grooves in the peripheral surface, and the plurality of grooves being shaped and disposed to interact with the plurality of protrusions to modify a transmittal of a driving force from the capstan to the conveyor belt. In further embodiments of the above conveyor, the belt has a longitudinal pitch higher than two inches in case of a plastic belt, and higher than one inch in case of a metal belt.

According to a feature of the invention, there is provided a conveyor belt for use in spiral conveyors, said conveyor having a driven capstan with a generally cylindrical peripheral surface, said belt being of a type that is capable of telescoping at one edge to conform in a spiral shape to said peripheral surface, comprising: a body consisting of interconnected elements, the elements interconnect to form a longitudinally pitched belt, the body having an inner edge for contacting said peripheral surface, wherein the longitudinal pitch is greater than two inches.

According to still another feature of the invention, the above belt has a longitudinal pitch greater than one inch and the inner edge includes a plurality of protrusions, the plurality of protrusions being disposed and shaped to increase a friction with the capstan.

According to a feature of the invention, there is provided a conveyor belt for use in spiral conveyors, the conveyor having a driven capstan with a generally cylindrical peripheral surface, the belt being of a type that is capable of telescoping at one edge to conform in a spiral shape to the peripheral surface, comprising: a body made predominantly of metal, the body consisting of interconnected elements, the elements interconnected to form a longitudinally pitched belt, the body having an inner edge for contacting the peripheral surface, wherein the longitudinal pitch is greater than one inch.

According to still another feature of the invention, the above belt has an inner edge which includes a plurality of protrusions, the plurality of protrusions being disposed and shaped to increase a friction with said capstan. The above belts may be made of plastic, or non-metal, as well.

The end units and reenforcement links may be flat plates, or have other shape useful in the spiral conveyor systems.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 7A and 7B are top and side views, respectively, of a portion of an edge of a prior art plastic conveyor belt without reenforcement links.

FIGS. 8A and 8B are top and side views, respectively, of a portion of an edge of a prior art plastic conveyor belt with reenforcement links.

FIGS. 8'A and 8'B are top and side views, respectively, of a portion of an edge of a prior art plastic conveyor belt driven by the sprocket wheels.

FIGS. 9A and 9B are top and side views, respectively, of an edge of a plastic conveyor belt according to one embodiment of the present invention.

FIGS. 10A and 10B are top and side views, respectively, of an edge of a plastic conveyor belt made according to the present invention.

FIGS. 11A and 11B are top and side views, respectively, of an edge of a plastic conveyor belt according to a further embodiment of the present invention.

FIGS. 12A and 12B are top and side views, respectively, of an edge of a plastic conveyor belt according to yet another embodiment of the present invention.

FIGS. 13A and 13B are top and side views, respectively, of an edge of a plastic conveyor belt according to an additional embodiment of the present invention.

FIGS. 14A and 14B are top and side views, respectively, of an edge of a plastic conveyor belt according to a further embodiment of the present invention.

FIGS. 15A and 15B are top and side views, respectively, of an edge of a plastic conveyor belt according to another embodiment of the present invention.

FIGS. 16A and 16B are top and side views, respectively, of an edge of a plastic conveyor belt according to an embodiment of the present invention.

FIGS. 20A and 20B are top and side views, respectively, of an edge of a plastic conveyor belt according to an embodiment of the present invention.

DETAILED DESCRIPTION OF THE PREFERRED EMBODIMENT

Figure 1:
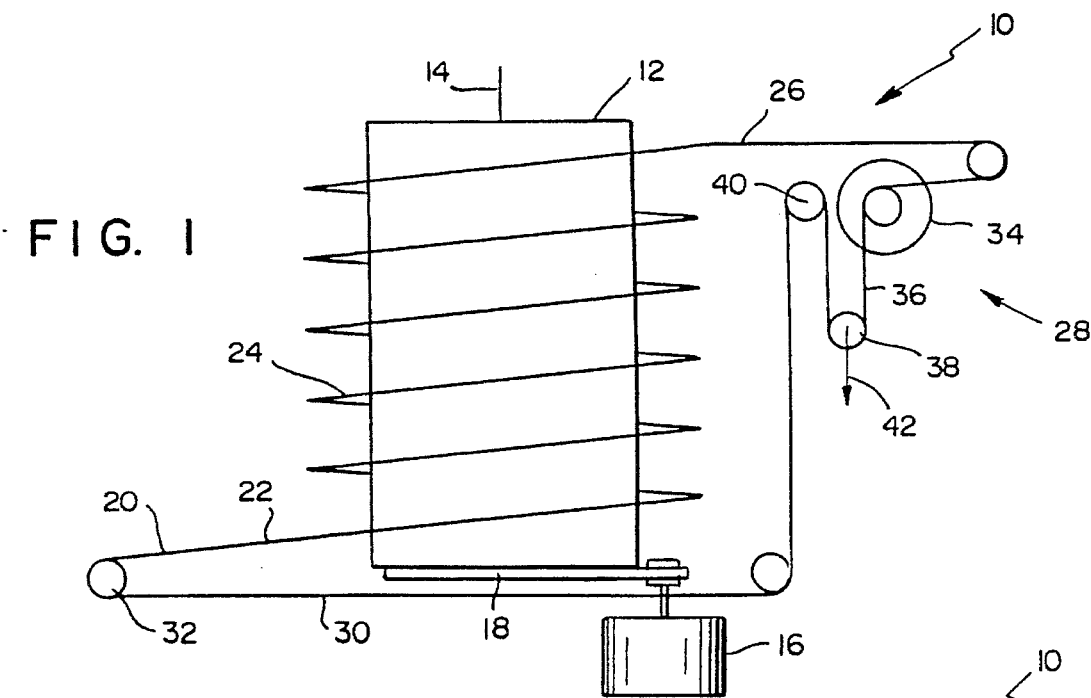
FIG. 1 is a schematic diagram of a spiral conveyor in which the present invention may be employed.

Referring to FIG. 1, there is shown, generally at 10, a spiral conveyor system to which the present invention may be applied. A capstan 12 is rotated about its vertical longitudinal axis 14 by any convenient means such as, for example, an electric motor 16 driving a chain 18.

A conveyor belt 20 is formed into an in-run 22, a spiral portion 24, an out-run 26, a take-up section 28 and a return run 30. A plurality of pulleys 32 shape conveyor belt 20 into its various parts.

Take-up section 28 includes a sprocket drive 34 for applying a predetermined longitudinal tension to out-run 26. A take-up loop 36 is formed by sprocket drive 34 and take-up pulleys 38 and 40. A take-up force 42, indicated by a downward-directed arrow, is applied to take-up pulley 38 to help form take-up loop 36. Take-up force 42 may be applied by any convenient means such as, for example, a pendant weight, not shown.

Spiral conveyor system 10 is illustrated as an up spiral or helix. Some applications employ a down spiral. Other applications combine an up spiral with a down spiral with the out-run of one feeding the in-run of the other.

Conveyor belt 20 is of a type which permits a limited amount of longitudinal telescoping to form spiral portion 24. Such types of conveyor belt are well known and are fully described in, for example, the above-referenced patents. Thus, further detailed description thereof is considered not required, except insofar as it is necessary to support the present detailed description.

In operation, sprocket drive 34 applies a predetermined longitudinal tension to out-run 26. This at least partly controls the tightness with which the inner edge of spiral portion 24 contacts the surface of capstan 12, and thus controls the friction between these elements. It is customary to permit capstan 12 to rotate at a speed which produces a surface velocity exceeding the velocity of the inner edge of spiral portion 24 contacting capstan 12. This speed difference, called overdrive, is from a few percent to a few tens of percent. The amount of overdrive is conventionally adjusted by adjusting the amount of longitudinal tension applied by sprocket drive 34. In some applications, sprocket drive 34 is mechanically coupled to electric motor 16 for concerted action thereof. In other applications, sprocket drive 34 is driven by a separate apparatus, optionally under closed-loop control for maintaining a predetermined tension in out-run 26, or a predetermined speed of spiral conveyor system 10.

In the prior art, capstan 12 may have a solid surface, or may be formed of a plurality of vertical bars (not shown in FIG. 1). For the remainder of the present disclosure, the invention is described in the environment wherein capstan 12 is of the type formed of vertical bars. One skilled in the art will recognize that the invention is not limited to this environment, but may be applied to a capstan 12 having a solid, or other surface.

The problem to be solved is transferring sufficient driving force from capstan 12 to spiral portion 24, preferably while maintaining a satisfactory amount of overdrive.

Figure 2:
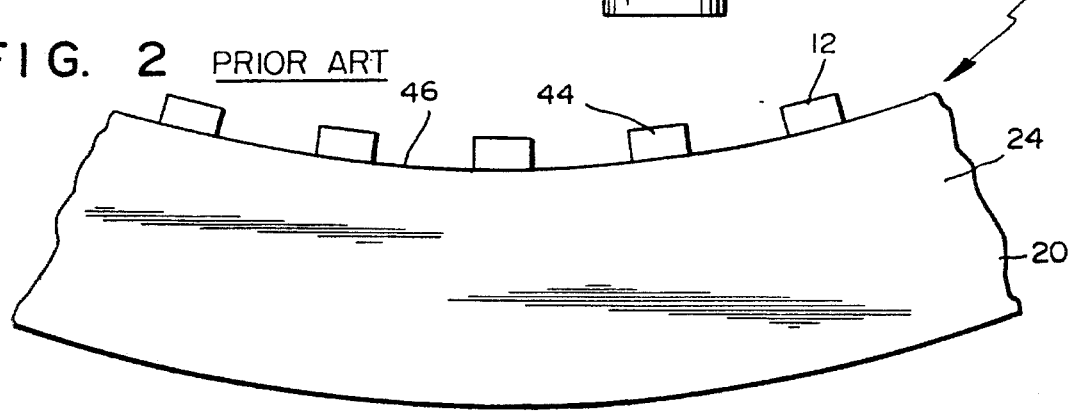
FIG. 2 is a fragmentary plan view of a portion of the spiral conveyor of FIG. 1 to which reference will be made in describing the prior art and the present invention.

Referring now to FIG. 2, capstan 12 is essentially a cage constructed of a plurality of vertical bars 44 supported by conventional means to form an approximation of a cylindrical surface. It is friction at the interface between the outer surfaces of vertical bars 44 and an inner edge 46 of conveyor belt 20 which drives spiral portion 24.

Figure 3:
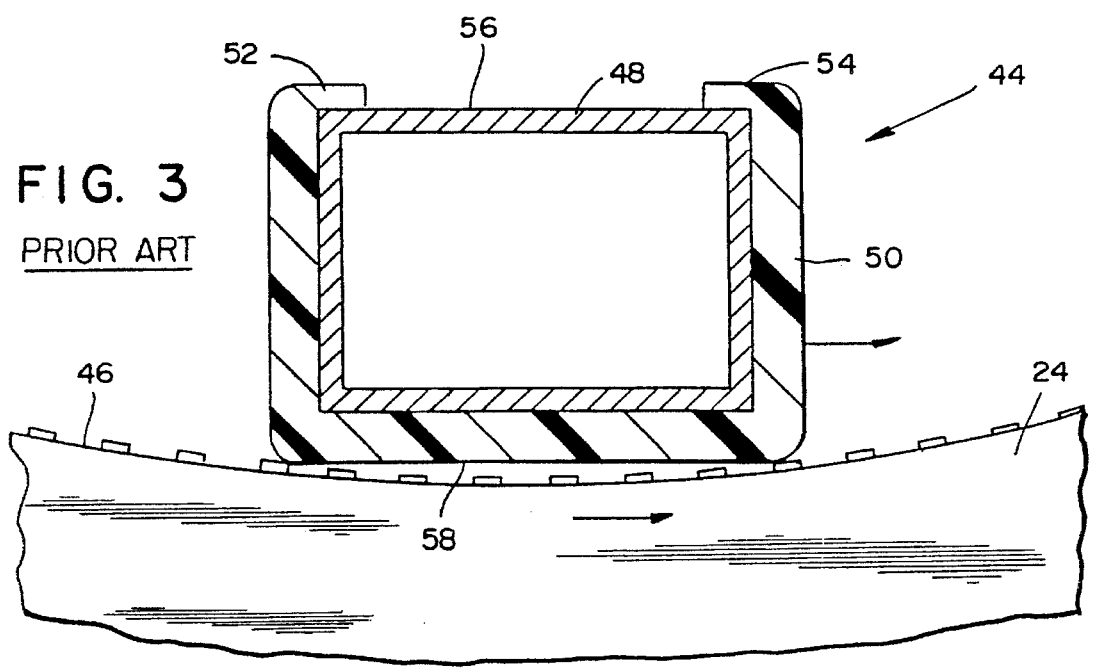
FIG. 3 is a close-up cross section of one vertical bar of FIG. 2 and a conveyor belt according to the prior art.

Referring now to FIG. 3, an enlarged cross section of vertical bar 44 is shown, together with an inner edge 46 of one type of conveyor belt 20 (a more detailed drawing of the edge of the prior art belt used in a spiral type conveyors is depicted on FIGS. 7A, 7B, 8A and 8B).

Vertical bar 44 includes a rectangular tube 48, upon which is clipped a U-shaped resin member 50. First and second lugs 52 and 54 grip an inner surface 56 of rectangular tube 48. An outer bearing surface 58 of U-shaped resin member 50 bears against inner edge 46. For purposes of description, conveyor belt 20 is assumed to be of a type wherein transverse bars (not shown) are terminated in an enlarged portion 60 usually consisting of the flat reenforcement links.

It is seen that, in actuality, it is the surfaces of enlarged portions 60 which contact outer bearing surface 58 for the frictional transmission of motive force from vertical bar 44 to spiral portion 24.

Figure 4:
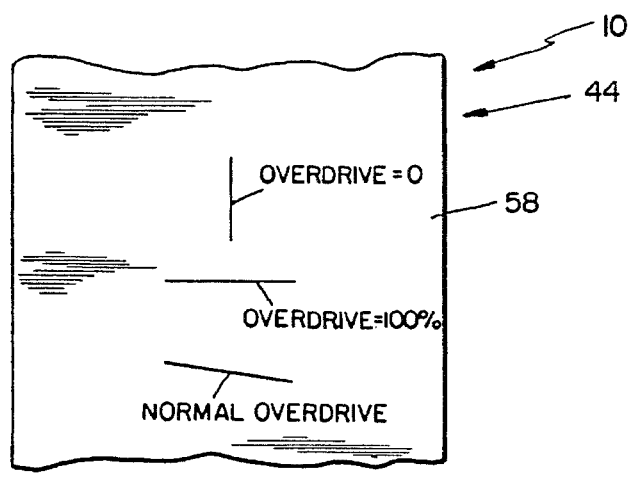
FIG. 4 is a fragmentary side view of a portion of the vertical bar depicted in FIG. 3 and illustrating certain desirable and undesirable conveyor capstan/belt contact relationships which can occur during operation of a conveyor.

Referring now to FIG. 4, a few basics of the operation of spiral conveyor system 10 are described. The concept of overdrive must be understood. As spiral portion 24 rotates about capstan 12, at each revolution, spiral portion 24 experiences a change in height equal to the distance between tiers of spiral portion 24. If the peripheral speed of capstan 12 were exactly matched to the speed of inner edge 46, then a point on inner edge 46 would remain in the same transverse location on a outer bearing surface 58 as it rises or descends with its advancement about capstan 12. Thus this point on inner edge 46 would trace a vertical line on outer bearing surface 58, as indicated by a line labelled overdrive =0. This is generally considered to be undesirable since experience has shown that this tends to develop substantial resistance to vertical motion of conveyor belt 20. This arises, at least partly, from a tendency for points on inner edge 46 to catch on vertical bar 44.

From a practical standpoint, it is possible to discern the amount of overdrive that exists in a particular spiral conveyor system 10. With use, enlarged portions 60 leave easily visible scratches in outer bearing surface 58. The angle that these scratches make with a vertical line is indicative of the amount of overdrive.

If overdrive equals 100 percent, no motion of conveyor belt 20 is produced. This results in horizontal scratches, as shown in FIG. 4. This is, of course, undesirable since zero motion of conveyor belt 20 means that spiral conveyor system 10 is non-functional.

Normal overdrive of a few percent is indicated by a diagonal line as shown in FIG. 4. The angle that the scratch marks make with the vertical or horizontal are indicative of the amount of overdrive. The relationship between these angles and the actual amount of overdrive depends on the dimensions of the system. However, from a qualitative standpoint, the steeper the angle from the horizontal, the less the overdrive.

The overdrive experienced by a particular spiral conveyor system 10 can change with time due to changes in load, temperature, humidity and lubrication, among other things. Monitoring the angles of scratch marks on outer bearing surfaces 58 is a useful way of alerting a maintenance operator of changes in overdrive that may require correction.

As noted in the foregoing, as linear speeds increase, it becomes increasingly difficult to couple sufficient driving force between capstan 12 and spiral portion 24.

Figure 5:
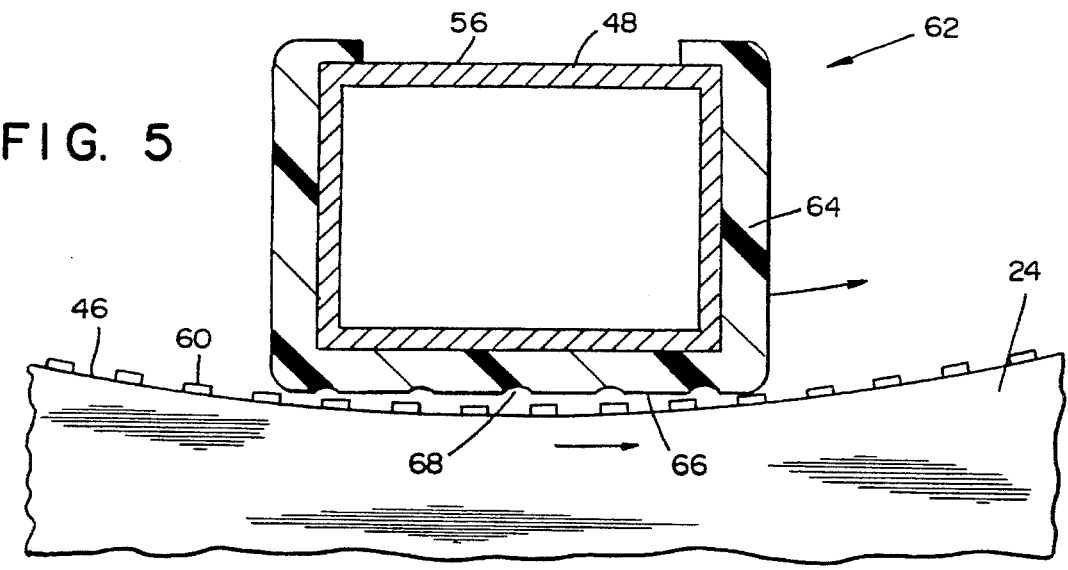
FIG. 5 is a close-up cross section of the vertical bar and a conveyor belt according to an embodiment of the invention.

Referring now to FIG. 5, a vertical bar 62 includes a U-shaped resin member 64 with an outer bearing surface 66 having a plurality of shallow vertical grooves 68 therein. The resulting irregularity in the outer bearing surface 66, as it contacts enlarged portions 60 increases the driving torque. However, several features prevent locking of enlarged portions 60 into grooves 68, and thus a zero-overdrive situation, with resulting improper operation, is avoided.

First, it will be noted that grooves 68 are shallow, and thus have relatively gentle slopes. Thus, if an enlarged portion 60 enters a groove 68, it is capable of sliding up and out therefrom with a slight increase in friction. The cumulative effect of all of the slight increases in friction provides the desired increase in the transfer of motive force from vertical bar 62 to spiral portion 24. Second, with one direction of rotation of capstan 12 (FIG. 1), angle of contact of enlarged portions 60 with outer bearing surface 66 tends to lift inner edge 46 of spiral portion 24 (FIG. 2). This tends to release any binding which may occur. With the opposite direction of rotation of capstan 12, the angle of contact tends to urge inner edge 46 downward. Some installations may take advantage of the downward urging to increase driving friction.

The vertical grooves 68 in vertical bar 62 offer the advantage that they can be formed during the extrusion of U-shaped resin member 64, without extra cost beyond a possible one-time tooling cost for a modified extrusion die. It is believed that some benefit may be attained by slanting the grooves so that they form a right angle with angle of contact 70.

Figure 6:
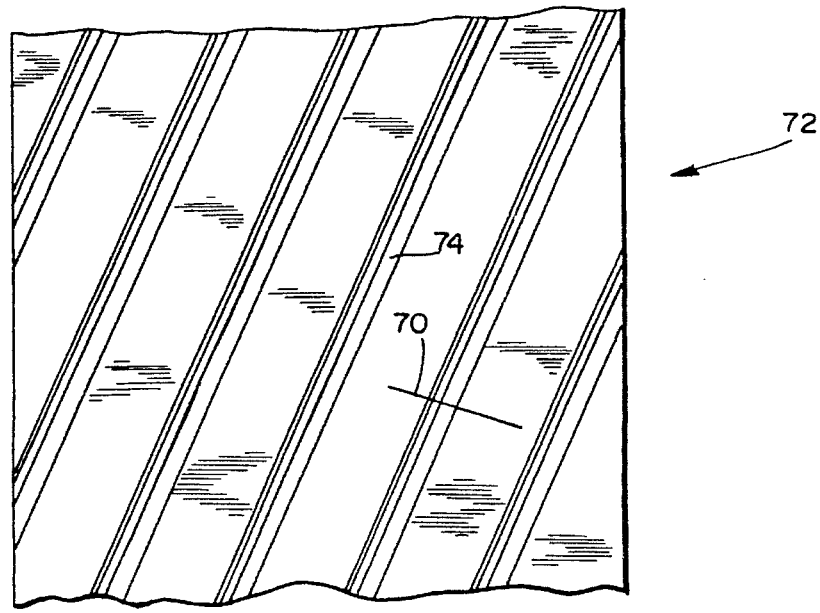
FIG. 6 is a side view of a vertical bar according to a further embodiment of the invention.

Referring to FIG. 6, a U-shaped resin member 72 is shown in which angled grooves 74 are disposed at right angles to angle of contact 70. This arrangement tends to maximize the increase in driving friction. It does, however, carry the disadvantage that angled grooves 74 cannot be formed during longitudinal extrusion of U-shaped resin member 72. Thus, if U-shaped resin member 72 is extruded, angled grooves 74 must be formed after extrusion by, for example, machining. If U-shaped resin member 72 is formed by casting, angled grooves 74 can be formed during the casting process.

Angled grooves 74 may be oriented at angles that do not make right angles with angle of contact 70. For example, if it is desired to lift or depress inner edge 46 (FIG. 2), then the angle of angled grooves 74 may be changed to accomplish this result. It is also within the contemplation of the invention to orient angled grooves 74 parallel to angle of contact 70. With this arrangement, enlarged portions 60 (FIG. 5) tend to ride within grooves 68. If the overdrive is increased above the design point as a result of changing environmental or other conditions, enlarged portions 60 tends to climb out of angled grooves 74. When this occurs, an increase in cumulative friction tends to return the overdrive to the design point. It is further within the contemplation of the invention to provide two sets of angled grooves 74, one aligned generally with angle of contact 70, and the other inclined at a different angle to angle of contact 70. The second set may be at right angles, or at some other angle, to angle of contact 70 according to the principles discussed above. It is likely that the two sets of angled grooves 74 are preferably at right angles to each other, but this is not a requirement of the present invention. Relative angles other than 90 degrees are within the contemplation of the invention.

It will be evident that the present invention is directed toward increasing the amount of driving force that can be transmitted to conveyor belt 20. As described above, this increased driving force may be used to increase the speed at which belt 20 is advanced. It would be clear to one skilled in the art that the increased driving force is equally useful for driving a more heavily loaded belt 20 at the same speed, or even lower speed.

Referring now to FIGS. 7A and 7B, a plastic belt 75 of the prior art is made of links consisting of main links 76 and end links 77 connected by rods 78. Rods 78 have heads 80 which may protrude. However, the manufacturer of this type of belt, KVP Systems of Rancho Cordoba, California does not recommend this type of belt for use in spiral conveyor systems because they feel that heads 80 are not strong enough to withstand the loads typical of spiral conveyors.

Referring to FIGS. 8A and 8B, another plastic belt, shown generally at 79, made of links manufactured presently by the KVP Systems consists of main links 76 and end links 77 connected by rods 78. End links 77 are reenforced by reenforcement links 82 which are connected to rods 78. Heads 84 are countersunk in depressions 86. This type of the belt is recommended by the KVP Systems for the spiral conveyors.

However, due to a lack of sufficient friction, adequate drive forces cannot be transmitted efficiently by this type of the plastic belt. The lack of the sufficient friction is a consequence of a low coefficient of friction characteristic for plastics. An attempt to increase the friction by increasing the longitudinal tension exposes this type of belt to excessive loads.

Referring to FIGS. 8'A and 8'B, a plastic belt 87 of the prior art, includes plastic links 89 such as those manufactured by the Intralox, Inc. Links 89 form a lattice-like structure having horizontal bars 93. Crossbars 91 are added to make the structure rigid. Crossbars 91 protrude beyond horizontal bar 93, forming protrusions 95, to add rigidity and strength to the structure. They protrude beyond the sides of link 89 as well, as is seen in the top view in FIG. 8'A. Links 89 are connected to each other by rods 78, which have button-like retainers to hold rods 78 in place.

Belt 87 is driven by a sprocket wheel which co-acts with a central portion of belt 87. This belt is a straight, rigid band, suitable for use in straight, not spiral, conveyors. The edge of this belt does not co-act with any driving mechanism, like a capstan, and is not functional in that sense. Protrusions 95 are no designed to engage in frictional contact with a driving mechanism.

The present invention includes edge treatments of plastic conveyor belts to allow transfer of driving force to the conveyor belt, especially for spiral conveyors. To further improve the transfer of the driving force to the conveyor belt, the present invention provides for the use of a plastic belt with a textured edge. The textured edge of the plastic belt may be used together with a textured capstan. These edge treatments are shown in more detail in FIGS. 9–16.

Figure 21A:
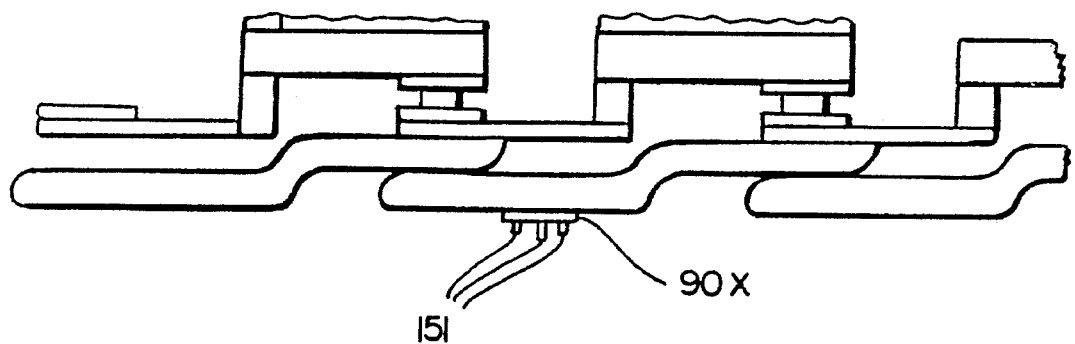
FIG 21A is a fragmentary top plan view on enlarged scale depicting a protrusion structure wherein the protrusions are formed as ridged structure.
Figure 21B:
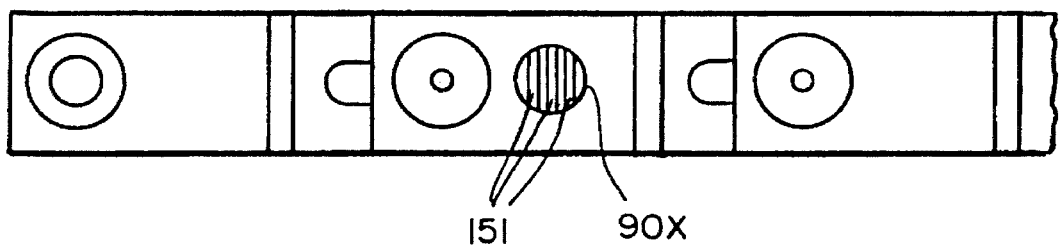
FIG 21B is a side view of the FIG. 21A structure.

FIGS. 9A and 9B show top and side views, respectively, of a portion of an edge of a plastic belt 88 according to one of the embodiments of the present invention. To increase the friction between the edge of the belt 88 and the capstan, reenforcement links 82 have buttons 90 protruding therefrom. Buttons 90 preferably have rounded edges. One button may be placed either on every reinforcement link 82, or on chosen reinforcement links 82 to achieve the desired co-action with the capstan. Instead of a button 90, any other shape of the protrusion increasing the friction and, at the same time, facilitating frictional engagement of the edge with the capstan so that belt 88 can be utilized in spiral conveyors. For example, vertical ridges, may be substituted for buttons 90, without departing from the spirit and scope of the invention. FIGS. 21A and 21B show how the protrusions 90X can be formed as a series of vertical ridges 151, these ridges being rounded in the manner described in the following sentence. The edges of the protrusions may be rounded to eliminate angled surfaces which may be difficult to disengage from the capstan. In spiral conveyors using overdrive, the ability for the elements of the textured edge to disengage from the capstan is very important. Therefore, the edge of a belt must provide suitable disengagement as well as suitable engagement with the capstan. Protrusions having rounded shapes permit such engagement and disengagement.

Such protrusions may be either molded, or attached to the belt separately. I.e., they may be so-called "field attached"

elements that can be retrofitted to existing belts. Reenforcement links 82 may be flat plates, as it is shown at FIG. 9A, or they may be of any other shape useful in the present application.

Referring now to FIGS. 10A and 10B, there is shown, generally at 92, a portion of an edge of a belt of the present invention having reenforcement links 82. Preferably, the belt is made of plastic. Field attached buttons 94 may be attached by any chosen means to reenforcement links 82. For example, they may be glued, threaded, welded, etc. The material of buttons 94 may be plastic, metal, ceramics or other suitable material.

FIGS. 11A and 11B show top and side views, respectively, of an edge of a conveyor belt, shown generally at 96, (optionally made of plastic) which engages with the capstan according to one of the embodiments of the present invention. Reinforcement links 82 are secured by extended rods 98 extending past reenforcement links 82. Extended rods 98 may be made of metal, plastic, co-extruded material (metal core with plastic body) or any other suitable material.

FIGS. 12A and 12B show top and side views, respectively, of an edge of a conveyor belt which interacts with the capstan according to a further embodiment of the present invention. This embodiment is similar to the embodiment shown on FIGS. 9A and 9B, except that end links 77 are not reenforced with reenforcement links 82. Therefore, buttons 90 are attached directly to end links 77. According to the invention, end links 77 may be flat plates, or they may be of any other shape useful in the present application.

FIGS. 13A and 13B show top and side views, respectively, of an edge of the conveyor belt according to one of the embodiments of the present invention. This embodiment is similar to the embodiment shown on FIGS. 10A and 10B, except here, end links 77 do not have reenforcement links 82. Therefore, field-attached buttons are attached to end links 77. Field-attached buttons 94 are of partially spherical shape, and have rounded edges to ease the interaction with the capstan.

FIGS. 14A and 14B show top and side views of an edge of the conveyor belt which engages with a capstan according to one of the embodiments of the present invention. This embodiment is similar to the embodiment shown on FIGS. 11A and 11B, except here, end links 77 are not reenforced with reenforcement links 82. Extended rods 94 extend past end links 77 to contact the surface of a capstan.

FIGS. 15A and 15B and 16A and 16B show top and side views of an edge of conveyor belts which engages with a capstan according to further embodiments of the present invention.

On FIGS. 15A and 15B, generally at 100, there is shown a portion of an edge of the belt of the present invention. Rods 78 have protruding heads 102 protruding past links 77. Protruding heads 102, may be given the shape of buttons, partially spherical shapes, or may have any other rounded shape. These shapes provide smooth engagement with the capstan. Rods 78 can be made of different materials, and can be factory or field installed.

On FIGS. 16A and 16B, generally at 104, there is shown a portion of the belt of the present invention having rods 78 with protruding heads 102 extending past end links 77. Heads 102 are rounded and button-like to provide a smooth engagement with the capstan. Rods 78 can be made of different materials, and can be factory or field installed. Heads 102, as well as all button-like shapes described above, may have partly spherical outer surfaces.

Figure 17:
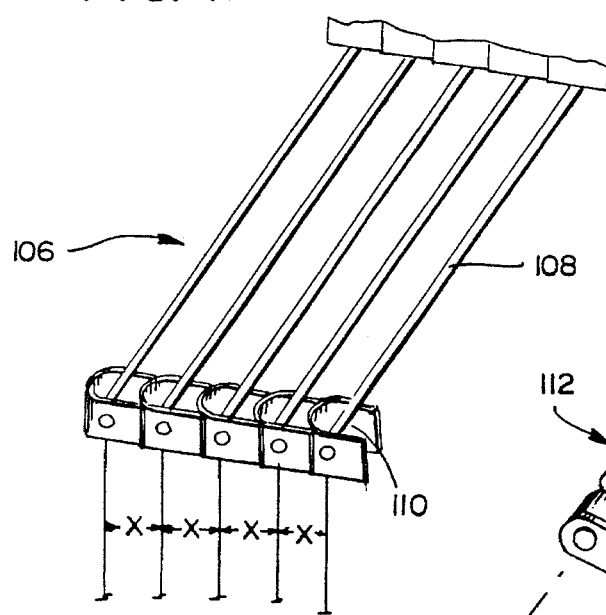
FIG. 17 is a view of a portion of a metal conveyor belt for spiral conveyors of the prior art.

Referring to FIG. 17, there is shown, generally at 106, a portion of a metal conveyor belt for spiral conveyors of the prior art. It consists of rods 108 connected with the help of links 110. This belt has a longitudinal pitch X. The longitudinal pitch X is typically either ¾ of an inch, or one inch. The longitudinal pitch greater than one inch is not used for metal belts for spiral conveyors presently, because their ability to be driven is poor. The increased longitudinal pitch is a problem for plastic belts as well.

Figure 18:
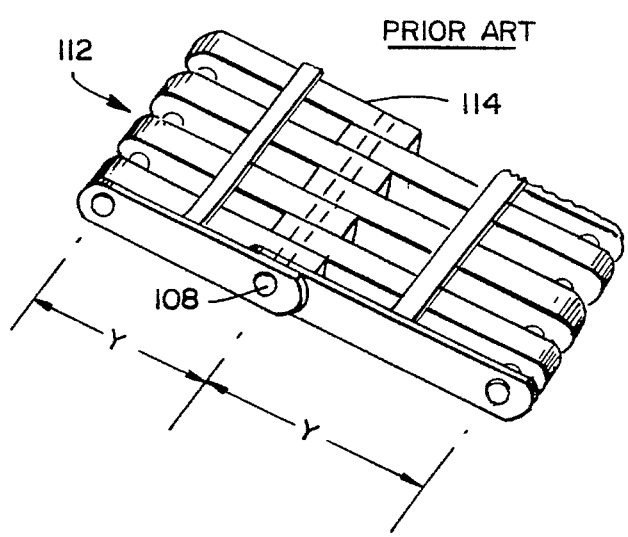
FIG. 18 is a view of a portion of a plastic belt for spiral conveyors of the prior art.

On FIG. 18, there is shown, generally at 112, a portion of a plastic belt for spiral conveyors of the prior art. It consists of links 114 connected with rods 108. The longitudinal pitch of this belt is indicated by Y. The largest pitch available for plastic belts for spiral conveyors is two inches. Using such belt with the pitch greater than two inches would cause difficulties with its driving.

Figure 19:
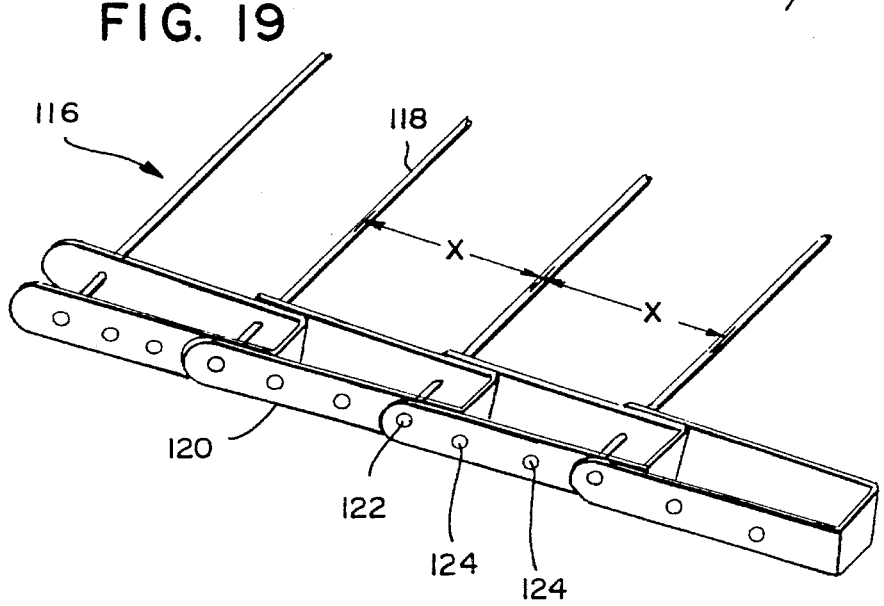
FIG. 19 is a view of a portion of a metal belt according to an embodiment of the present invention.

Referring to FIG. 19, there is shown, generally at 116, a portion of a metal belt according to one embodiment of the present invention. It consists of rods 118 connected with end links 120. The longitudinal pitch of this belt is indicated by X. It is greater than one inch, and is typically three inches. Heads of rods 122 protrude and provide an aid to drive the belt. In addition, protrusions 124 are placed on links 120 to enhance the belt's ability to be driven. Protrusions 124 are made here as buttons with rounded edges, but they may be of any shape.

Referring to FIGS. 20A and 20B, there is shown, a plastic conveyor belt 126 having a textured edge according to one embodiment of the present invention. It consists of main links 76 connected with rods 78 which have protruding heads 102. End links 77 have buttons 90 to increase a driving force to drive the belt. The longitudinal pitch of this belt is four inches, as it is indicated on the FIG. 20A. There may be just one button 90, or several of them, or none, depending on the requirements as to a particular belt with a particular pitch. Placement of the buttons 90 on end links 77 greatly enhances driving belts with pitches greater than two inches, e.g., belts having longitudinal pitches from 3 to 6 inches. Therefore, placement of protrusions along an inside edge of plastic and metal belts will greatly enhance their ability to be driven. All belt embodiments described above may be used for belts with the longitudinal pitch greater than one inch for predominantly metal belts, and greater than two inches for predominantly non-metal belts. Additional protrusions may be placed in these cases on the edge of belts, e.g., on their end links, reenforcement links, etc., to improve belt driving characteristics.

All the edge treatments illustrated on FIGS. 9A–16B, 19, 20A and 20B may have protrusions either on every link, or on chosen links to achieve satisfactory performance. The protrusions can be disposed at any convenient center-to-center distance (particularly helpful in facilitating field installation) as long as adequate drive friction is provided. The protrusions may be made of any convenient material such as, for example, plastic, metal, ceramics, combination of those, and co-extruded materials. The protrusions can be molded together with the end links, reenforcement links, rods, or other surface designed to engage the capstan, or they may be field installed.

The shapes of the protrusions are not limited to the shapes shown on FIGS. 9A–16B, 19, 20 and. 20B. They may include vertical ridges, buttons, rods, teeth, or any other type of protrusions which provides satisfactory drive friction and strength when used in a spiral conveyor systems.

All of the edge treatments of the present invention are applicable to a wide range of belt styles. They are not restricted to plastic belts, and may be used in metal, ceramic, or belts of other material. The conveyor belts of the present invention may comprise main links of different configurations, and end units, or links, and reenforcement links, may be either flat plates, or of any other shape useful in the present invention.

To obtain improved transfer of the driver force to the belt, the present invention provides for a system consisting of the belt having protrusions on its edge, and a co-acting textured capstan. This combination provides improved friction between the capstan and the edge of the belt, resulting in better transmission of the drive force. When such a combination is used, it is possible to greatly improve the utility of plastic belts in spiral conveyor systems. The types of protrusions used include the embodiments shown at FIG. 9–16, 19, 20A and 20B. The combination of the textured capstan and textured conveyor's edge permits the use of protrusions made of plastic which would be too brittle to use in the spiral conveyors. Such a combination also permits greatly improved drive efficiency, belt life and applicability of plastic belts to spiral conveyors.

The edge treatments of the present invention in plastic belts also permits their use with smooth capstans.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a spiral conveyor system, a capstan rotatable about a vertical axis, the capstan including a plurality of circularly spaced capstan bars, the bars having outer surfaces which traverse a generally cylindrical travel path during capstan rotation, a belt comprising a succession of plastic link units interconnected end-on-end with each other, the link units being telescoping with each other at a belt side margin so that the belt can longitudinally foreshorten at said side margin incident winding it in a spiral belt run around the capstan with link unit side edges in friction drive contact with the capstan bar outer surfaces whereby the rotation of the capstan frictionally drives the belt through the spiral belt run, and cooperating means carried on said belt side edges and on said capstan bar outer surfaces for enhancing frictional contact therebetween, the cooperating means comprising projections on one of the belt side edges and the capstan bar outer surfaces and grooves, projections being on said belt link side edges or the capstan bar outer the grooves being on the other of the belt side edges and the capstan bar outer surfaces.

* * * * *

UNITED STATES PATENT AND TRADEMARK OFFICE
CERTIFICATE OF CORRECTION

PATENT NO. : 5,467,865

DATED : November 21, 1995

INVENTOR(S) : Guy L. Irwin

It is certified that an error appears in the above-identified patent and that said Letters Patent is hereby corrected as shown below:

Column 14,

Claim 1, line 19, delete "projections".

Claim 1, line 20, delete entire line.

Claim 1, line 21, delete "outer".

Signed and Sealed this

Twelfth Day of March, 1996

*Attest:*

BRUCE LEHMAN

*Attesting Officer*     *Commissioner of Patents and Trademarks*